(12) United States Patent
Wautier (10) Patent No.: US 8,987,343 B2
(45) Date of Patent: Mar. 24, 2015

(54) BRANCHED POLY (HYDROXY ACID) AND PRODUCTION PROCESS THEREOF

(75) Inventor: Henri Wautier, Braine le Comte (BE)

(73) Assignee: Solvay SA, Brussels (BE)

( * ) Notice: Subject to any disclaimer, the term of this patent is extended or adjusted under 35 U.S.C. 154(b) by 388 days.

(21) Appl. No.: 13/262,500

(22) PCT Filed: Apr. 2, 2010

(86) PCT No.: PCT/EP2010/054459
§ 371 (c)(1),
(2), (4) Date: Sep. 30, 2011

(87) PCT Pub. No.: WO2010/112602
PCT Pub. Date: Oct. 7, 2010

(65) Prior Publication Data
US 2012/0027973 A1    Feb. 2, 2012

(30) Foreign Application Priority Data
Apr. 2, 2009 (FR) ...................... 09 52113

(51) Int. Cl.
*B29D 22/00* (2006.01)
*B32B 1/08* (2006.01)
(Continued)

(52) U.S. Cl.
CPC ................ *C08G 63/06* (2013.01); *B32B 27/36* (2013.01); *C08G 63/08* (2013.01); *C08G 63/80* (2013.01); *C08J 5/18* (2013.01); *C08J 2367/04* (2013.01)
USPC .......... 522/165; 522/148; 522/166; 428/35.7; 528/297

(58) Field of Classification Search
CPC ........... C08L 67/04; C08L 67/08; B32B 1/00; B32B 27/08
USPC ............ 428/35.7; 528/26, 296, 110; 522/148, 522/165, 166
See application file for complete search history.

(56) References Cited

U.S. PATENT DOCUMENTS 4,167,395 A * 9/1979 Engelhardt et al. ............... 8/557
5,242,972 A * 9/1993 Negishi et al. ................ 524/545
(Continued)

FOREIGN PATENT DOCUMENTS

CN   1341135      3/2002
JP   8100057 A    4/1996
(Continued)

OTHER PUBLICATIONS

Takahashi, K., et al.—"Melt/solid polycondensation of glycolic acid to obtain high-molecular-weight poly(glycolic acid)"—Polymer [ISSN 0032-3861], (2000), vol. 41, N 24, p. 8725-8728—Elsevier, Kidlington, ROYAUME-UNI (1960) (Revue); 4 pgs.
(Continued)

*Primary Examiner* — Michael Pepitone
*Assistant Examiner* — Jessica Roswell (57) ABSTRACT

Process for manufacturing a polymer by polycondensation of a hydroxy acid, said polymer comprising at least 80% by weight of units that correspond to the hydroxy acid, according to which at least one polyfunctional reactant capable of giving rise to the formation of a three-dimensional polymer network is mixed with the hydroxy acid, and according to which the mixture is subjected to temperature and pressure conditions and for a duration which are all suitable for giving rise to the formation of the network. Poly(hydroxy acid) (PHA) obtainable by such a process.

10 Claims, 6 Drawing Sheets

(51) Int. Cl.
  *C08G 63/42*  (2006.01)
  *C08G 63/06*  (2006.01)
  *B32B 27/36*  (2006.01)
  *C08G 63/08*  (2006.01)
  *C08G 63/80*  (2006.01)
  *C08J 5/18*   (2006.01)

(56) References Cited

U.S. PATENT DOCUMENTS

| | | | |
|---|---|---|---|
| 5,594,095 | A | 1/1997 | Gruber et al. |
| 5,686,540 | A * | 11/1997 | Kakizawa ............ 525/444 |
| 5,914,381 | A | 6/1999 | Terado et al. |
| 6,140,458 | A | 10/2000 | Terado et al. |
| 6,528,617 | B1 | 3/2003 | Terado et al. |
| 8,058,470 | B2 | 11/2011 | Uyama et al. |
| 2006/0147666 | A1 * | 7/2006 | Christel et al. ......... 428/36.92 |

FOREIGN PATENT DOCUMENTS

| | | |
|---|---|---|
| JP | H08-100057 | 4/1996 |
| JP | 9110971 A | 4/1997 |
| JP | H10-324738 | 12/1998 |
| JP | 11130852 A | 5/1999 |
| JP | 20060008972 A | 1/2006 |
| JP | 2008-115288 | 5/2008 |
| JP | 2008-156665 | 7/2008 |
| WO | WO 20070027043 A1 | 3/2007 |
| WO | 2008029527 | 3/2008 |

OTHER PUBLICATIONS

Kim, E.K., et al.—"Preparation and properties of branched polybutylenesuccinate"—Journal of Applied Polymer Science [ISSN 0021-8995], (2001) vol. 80, N 9, p. 1388-1394; 7 pgs.

* cited by examiner

BRANCHED POLY (HYDROXY ACID) AND PRODUCTION PROCESS THEREOF

CROSS REFERENCE TO RELATED APPLICATIONS

The present application is a U.S. national stage entry under 35 U.S.C. §371 of International Application No. PCT/EP2010/054459 filed Apr. 2, 2010, which claims the benefit of the French application no. 09.52113 filed on Apr, 2, 2009, the whole content of this application being herein incorporated by reference for all purposes.

The present invention relates to a branched poly(hydroxy acid) (PHA), to a process for the manufacture thereof, and to a film or hollow body comprising at least one layer based on such a PHA.

Hydroxy acids may be polycondensed in order to form polymers and some of them (glycolic acid (GA), lactic acid (LA), etc.) have been the subject of a resurgence of interest in recent years due to their bio-sourced nature.

The conventional synthesis of polyglycolide (PGA) adopts the same philosophy as the synthesis of polylactide. Firstly, a polycondensation of glycolic acid is carried out in order to obtain a low molecular weight oligomer. Then, at high temperature and low pressure, this oligomer is depolymerized with a view to distilling mainly the cyclic diester, glycolide. A relatively large number of purification steps follow in order to obtain an ultrapure (>99.90%) glycolide, which will then be subjected to a ring-opening polymerization (in accordance with a procedure similar to the polymerization of the caprolactone monomer, for example). The polymer obtained is linear and has a high molecular weight. Its cost price is high due to the cost of the depolymerization reaction and of the purification of the glycolide.

In fact, the first step of this process does generally not make it possible to obtain high enough molecular weights (this is why they were described as oligomers above), hence the need to resort to the subsequent steps. Takahashi et al., (Polymer, 41 (2000), 8725-8728: Melt/solid polycondensation of glycolic acid to obtain high molecular weight poly(glycolic acid)) describes a process that makes it possible to obtain higher molecular weight PGA by melt polycondensation in the presence of certain catalysts such as Zn acetate (hydrated or non-hydrated, the first being preferred). Although the molecular weights that are reported therein are relatively high, the Applicant, having reproduced the examples that were described therein and measured the melt viscosity (according to a procedure which will be described below), found very low values (of the order of 1 Pa·s) and observed an almost negligible melt strength, probably linked to the fact that the molecules obtained are linear.

However, melt strength is essential for processing operations of the type: blow moulding of film, extrusion of a sheet or manufacture of a multilayer bottle by extrusion-blow moulding. Since PGA has barrier properties that are comparable to those of EVOH or PVDC, its use in a PET/PGA/PET bottle structure would be very advantageous for packaging carbonated beverages that are oxygen-sensitive such as beer for example.

It is known from the literature to add polyfunctional agents to the polycondensation medium of certain polyesters in order to modify the structure thereof. Thus, Kim et al. (Journal of Applied Polymer Science, Vol. 80, 1388-1394 (2001)) describe the use of trimethylolpropane (TMP) in the polycondensation medium of succinic acid and 1,4-butanediol in order to form a branched PBS (poly(butylene succinate)). The Applicant has attempted to apply this teaching to hydroxy acids such as GA and LA to produce PGA and PLA, without succeeding in obtaining polymers that have a sufficient melt strength for the aforementioned types of processing operations.

The objective of the present invention is to solve this problem and to provide (a process for manufacturing) polycondensed hydroxy acid polymers having an improved melt strength allowing in particular a processing operation as described above.

For this purpose, the present invention relates to a process for manufacturing a polymer by polycondensation of a hydroxy acid, said polymer comprising at least 80% by weight of units that correspond to the hydroxy acid, according to which at least one polyfunctional reactant capable of giving rise to the formation of a three-dimensional polymer network is mixed with the hydroxy acid, and according to which the mixture is subjected to temperature and pressure conditions and for a duration which are all suitable for giving rise to the formation of the network.

In this way, the oligomers obtained during the polycondensation are combined together to form said network, which has the effect of increasing the molecular weight and of providing a novel melt viscosity behaviour compared to the known conventionally linear polyglycolide (PGA from PURAC).

The present invention may be applied to all hydroxy acids capable of polycondensing, i.e. of forming a macromolecule by condensation (chain addition of monomers with removal of water). It gives good results, in particular with glycolic acid (GA) and lactic acid (LA). In general, hydroxy acids that have a primary alcohol are preferred as they are more reactive. Glycolic acid (GA) is very particularly preferred. In one variant of the present process, the hydroxy acid is biosourced, that is to say derived from a natural and renewable raw material, as opposed to a fossil raw material. The use of bio-sourced hydroxy acids allows the synthesis of "green" polymers, that is to say polymers synthesized from renewable raw material.

The process according to the present invention is suitable for the manufacture of polymers containing at least 80% by weight of units corresponding to the initial hydroxy acid, preferably at least 90% by weight, in particular at least 95% by weight.

According to the invention, polyfunctional molecules (multifunctional organic compounds) are added to the hydroxy acid before its condensation, these molecules being capable of leading to the formation of a three-dimensional network generally based on oligomers of the acid joined to one another by nodes constituted by the reaction sites. The term "polyfunctional" is understood to mean that these molecules contain at least 2 reactive groups, preferably at least 3, or even 4.

In order to be able to produce a three-dimensional network, the molecules added generally contain functional groups capable of reacting with the acid functional group of the hydroxy acid, functional groups capable of reacting with the alcohol functional group of the hydroxy acid and functional groups capable of making the oligomers being formed react with one another. It should be noted that a given functional group may be involved in 2 or even 3 of these types of reactions, and that, in addition, these functional groups may be present on one and the same reactant (variant 1) or be present on different reactants that are used as a mixture (variant 2).

Examples of reactants that give good results within the context of the 1$^{st}$ variant are multifunctional silanes that have, besides the silane functional group, either at least two other groups capable of reacting with the acid functional group and with the hydroxide functional group of the hydroxy acid, or at least one group capable of reacting with the acid or the hydroxide while generating a new active functional group capable of reacting with a new acid functional group (for example: an epoxide group). The advantage of silanes is that they can react with the water of condensation to create a network of —Si—O— linkages and thus participate in the branching of the polymer. Silanes of this type which give good results are epoxysilanes and in particular, glycidyloxypropyltrimethoxysilane.

Other reactants that give good results within the context of the 1$^{st}$ variant are polyepoxides such as bisphenol A diglycidyl ether (BADGE) or epoxidized oils such as epoxidized soybean oil or epoxidized linseed oil.

Examples of reactants that give good results within the context of the 2$^{nd}$ variant (active functional groups present on at least 2 molecules of different types) are the mixtures of at least one polyol with at least one polyacid, of which at least one of the polyol or of the polyacid is trifunctional, preferably tetrafunctional. Advantageously, the polyol and the polyacid are each at least trifunctionalized, for example tetrafunctionalized. Alcohols that give good results are ethylene glycol, trimethylolpropane and pentaerythritol; examples of acids that give good results are malic acid, succinic acid, tricarballylic acid and benzenetetracarboxylic or butanetetracarboxylic acid. A mixture that gives good results, in particular with GA and LA, is a stoechiometric mixture of pentaerythritol (=tetrol) and butanetetracarboxylic acid. Another mixture that gives good results, in particular with GA and LA, is a stoechiometric mixture of trimethylolpropane and tricarballylic acid.

The amount of reactant(s) is generally adapted to their "effectiveness" in terms of functionalities, a too low crosslinking leading to polymers that are too fluid and a too high crosslinking leading to polymers that are no longer able to be melt processed. In practice, good results have been obtained with GA and LA by using a few mol % of active functional groups per mol of GA or LA. In general, the amount of reactant(s) is of about 1 to 100 mmol of active functional groups per mol of GA or LA, most often of 2 to 50 mmol, in particular of 3 to 35 mmol, for example of about 3 to 12 mmol. Depending on the reactant(s) selected, the amount of reactant(s) may be of about 0.2 to 9% by weight of GA or LA, in particular of 0.5 to 6%, for example, depending on the nature of the reactant(s), of about 0.7% or else of 2.5%.

The polyfunctional reactant(s) may be added to the hydroxy acid in any known manner. Since hydroxy acids are generally sold as an aqueous solution, it is generally advantageous to dissolve the reactants in this solution, optionally by means of heating.

Preferably, the polycondensation reaction is carried out at least partly at a temperature that is high enough so that the reaction takes place in a reasonable time, but that is not too high, in order to avoid degradation (and the associated coloration problems). The duration of the polycondensation reaction is not critical and may be of about 2 to 24 h, most often of about 5 to 12 h, depending on the temperature. In practice, good results have been obtained with glycolic acid and lactic acid at a temperature between 160 and 240° C. In particular, for LA, the temperature is advantageously from 170 to 230° C., preferably from 180 to 210° C. For GA, the temperature is advantageously above 200° C. and below 240° C., in particular from 205 to 230° C., for example in the vicinity of 215 or 220° C. Such temperatures are within their melting/crystallization range so that, during the reaction, the crystallization of the polymer obtained is often witnessed. If the temperature during the polycondensation reaction is too low, the polymer obtained will have a melt viscosity and melt strength that are too low relative to what is desired for a processing operation of the type: blow moulding of film, extrusion of a sheet or manufacture of a multilayer bottle by extrusion-blow moulding.

In a first variant of the present process, once the polycondensation temperature is reached, it is kept as constant as possible throughout the whole of the polycondensation step, which corresponds to a single temperature plateau. According to the present invention, the expression "temperature plateau" means that the temperature is kept substantially constant for at least 5 minutes.

In a second variant, the temperature profile during the polycondensation step may be such that it includes more than one temperature plateau. Preferably, the various temperature plateaus are between 160 and 240° C. In particular, for LA, the various temperature plateaus are advantageously within the range of 170 to 230° C., preferably from 180 to 210° C. For GA, the various temperature plateaus are advantageously above 200° C. and below 240° C., in particular within the range of 205 to 230° C. In this second variant, the temperature difference between the various plateaus may vary from 5 to 30° C., in particular may be of about 10 to 20° C.

In another variant of the present process, that can possibly be combined with the two preceding variants, the polycondensation step may be followed by or end in a plateau at a lower temperature, in particular at a temperature of 10 to 70° C. below the temperature of the highest temperature plateau reached during the polycondensation step, for example at a temperature of about 150 to 190° C., preferably of 160 to 180° C. In this third variant, the lowest temperature plateau is generally maintained for 1 to 24 h.

Very particularly preferably, the polycondensation is initiated at a lower temperature (below the melting/crystallization temperature of the polymer), in order to favour the formation of oligomers and the removal of the water of reaction, and to prevent the distillation of the monomer when the temperature is increased. One way of proceeding consists in leaving the reaction mixture for a few hours, for example between 5 and 100 h, in particular between 12 and 80 h, in an oven at a temperature of 100 to 120° C. for GA, and of 50 to 80° C. for LA, before driving the temperature to a value above the melting temperature of the polymer that is desired to be obtained. The oven is usually a ventilated oven.

Hence, according to one preferred variant of the invention, the polymer is a semicrystalline polymer and the polycondensation is initiated over several hours at a temperature below the melting/crystallization temperature of the polymer (phase A of the polycondensation), and is then continued at a temperature close to the melting/crystallization temperature of the polymer until crystallization of said polymer (phase B of the polycondensation).

With semicrystalline polymers such as PGA (or PLA obtained from a single isomer of LA), it has been observed that these crystallize very rapidly, often even before the polycondensation reaction has finished. In this case, the Applicant has observed that it was preferable to carry out what is referred to as a solid post-condensation (SPC) step. This may take place by leaving the solid to rest, typically under vacuum, for several hours or even several days, at a temperature above its glass transition temperature but below its melting/crystallization temperature. Typically, such a SPC step may be carried out at a temperature of 140 to 200° C., in particular of 150 to 190° C., for example at around 170-180° C. and at a pressure below 10 mbar. Depending on the nature of the hydroxy acid, on the nature of the reactant(s), on their proportions and on the duration, on the temperature and on the pressure during the polycondensation step, the duration of the SPC step may be a few hours to 1 week, in particular from 6 to 150 h, for example of about 10 to 60 h. It should be noted that a too high temperature during the SPC step may also result in a coloration due to the thermal degradation of the polymer. A long duration does not, on the other hand, have a negative influence on the polymer obtained.

Preferably, phase B of the polycondensation and the SPC step take place under vacuum in order to evaporate the water of reaction and prevent the latter from hydrolyzing the polymer chains being formed. Very particularly preferably, phase B is initiated at atmospheric pressure and the vacuum is applied gradually until a pressure of the order of a few mbar, in particular less than 10 mbar, for example from 2 to 8 mbar, is achieved. The SPC step is typically carried out at a pressure of about 0.01 to 10 mbar, in particular of 0.05 to 5 mbar, for example of about 0.1 mbar.

Alternatively to a heat treatment under vacuum or SPC step, the solid obtained may be subjected to a post-condensation in a microwave device, preferably under conditions such that they cause the melting of the solid. In practice, durations of about 10 to 30 min at a power of 350 W gave good results.

In the process of the present invention, a milling step is advantageously carried out between the polycondensation step and the SPC step. Such a milling step may be carried out by any means known to a person skilled in the art, for example by milling in a rotary mill such as the Pulverisette® from FRITSCH. In one variant, a granulation step may be carried out at the end of the melt phase polycondensation in order to carry out the SPC step on granules. This granulation may especially be carried out at the outlet of the reactor on rods cooled in an air stream then introduced into a granulator. Such a granulation or milling is advantageous since it increases the surface area of the solid resulting from the polycondensation step, which allows an easier evaporation of the residual water present in the medium. Furthermore, the milled or granulated product is easier to handle.

In the process of the present invention, a polycondensation catalyst may optionally be added to the reaction medium. Such a catalyst is usually added in an amount of about 0.01 to 2%, in particular of about 0.1 to 1%. Such polycondensation catalysts are well known to a person skilled in the art and may be selected, for example, from tin (II) chloride, stannous octoate, zinc acetate, zinc lactate and methanesulphonic acid, methanesulphonic acid being preferred.

In the process of the present invention, an antioxidant may optionally be added to the reaction medium. Preferably, such an antioxidant is added between the hydroxy acid polycondensation step and the SPC step. Such an antioxidant is typically added in an amount of about 0.01 to 1% by weight of the medium, in particular of about 0.1 to 0.5%. Such antioxidants are well known to a person skilled in the art and may be selected, for example, from hindered phenols and hindered phosphites. Bis(2,4-di-t-butylphenyl)pentaerythritol diphosphite sold under the name ULTRANOX 626® by CHEMTURA and bis(2,6-di-t-butyl-4-methylphenyl)pentaerythritol diphosphite sold under the name ADK STAB PEP 36® by ADEKA PALMAROLE are particularly preferred.

The present invention also relates to a poly(hydroxy acid) (PHA) that can be obtained by the process described above. For this purpose, it relates to a PHA comprising poly(hydroxy acid) chains bridged into a three-dimensional network by polyfunctional molecules. The polymer of the invention is typically constituted of at least 80% by weight of units corresponding to the hydroxy acid, in particular of units corresponding to glycolic acid or lactic acid. These units corresponding to the hydroxy acid are generally present in the form of linear oligomer chains, said oligomer chains being joined to one another in a three-dimensional network by one or more multifunctional organic compounds. The polymer of the invention preferably comprises at least 90% by weight of units corresponding to the hydroxy acid, in particular at least 95% by weight. The polymer of the invention is preferably constituted of at least 95% of poly(hydroxy acid) (preferably glycolic or lactic acid) in the form of linear oligomer chains, and of one or more multifunctional organic compounds that join these linear chains in a three-dimensional network. The polymer of the invention is preferably a polyglycolide or a polylactide containing at least 80% by weight of units corresponding to glycolic acid or lactic acid respectively, preferably at least 90%, in particular at least 95%.

The structure of the PHA that can be obtained by the process described above will depend on the nature of the multifunctional organic compounds used. Thus, without wishing to be tied to any one theory, the PHAs obtained according to the $1^{st}$ variant of the invention in the presence of polyepoxides such as bisphenol A diglycidyl ether (BADGE) or epoxidized oils will probably exhibit an open branched structure in which two linear oligomer chains made from polycondensed hydroxy acid are attached to one original epoxide functional group. The PHAs obtained according to thee variant of the invention, in the presence of epoxysilanes will probably exhibit a star-type structure. Specifically, the silane functional groups may react with the water of condensation to create a network of —Si—O— linkages. The linear oligomer chains made from polycondensed hydroxy acid would therefore be arranged radially (or in a "star") around nodules constituted of a network of —Si—O— linkages.

Finally, the PHAs obtained according to the 2$^{nd}$ variant of the invention in the presence of polyols and of polyacids, at least one of which being trifunctional, will probably exhibit a structure that comprises loops, each loop comprising at least two linear oligomer chains made from polycondensed hydroxy acid, one molecule of polyol and one molecule of polyacid, these polyfunctional molecules making the link between oligomer chains within the loop and corresponding to branching points to other chains and/or loops.

Generally, these PHAs are polymers which are difficult or even impossible to put into solution, even in extremely active solvents such as HFIP (hexafluoroisopropanol).

These PHAs are generally characterized by a viscoelastic behaviour in the melt state that is non-Newtonian, i.e. that at a low velocity gradient (for example: at a frequency between 1 and 100 rad/s during ARES measurements), their viscosity is not constant but decreases when the frequency increases. Typically, at 240° C., this viscosity is of the order of tens or even hundreds of Pa·s at 100 rad/s and of the order of tens (or even hundreds) of thousands of Pa·s at 1 rad/s. Usually, it is thus possible to obtain, at 240° C., a viscosity of about 50 to 500 Pa·s at 100 rad/s and of about 1000 to 60 000 Pa·s at 1 rad/s.

The present invention finally relates to a film or hollow body comprising at least one layer of a hydroxy acid polymer as described above, preferably in combination with at least one layer of polyester, for example of polyethylene terephthalate (PET), or of polyethylene naphthalate (PEN). For example, the hydroxy acid polymer as described above may be used for the manufacture of a multilayer container comprising at least one layer of said hydroxy acid polymer, in particular of PGA or of PLA and at least one layer of a thermoplastic polyester, in particular of PET or of PEN.

The present invention is illustrated non-limitingly by the following examples. In these examples, the dynamic viscosity measurements were carried out using an ARES rheometer, under the conditions (of temperature and velocity gradient) indicated. The graphs that result therefrom illustrate the change in the viscosity (Eta, in Pa·s) as a function of the frequency (F in rad/s).

EXAMPLE 1

Comparative Example Outside of the Invention 17.2 g of pure (99%) solid glycolic acid were introduced into an 80 ml BUCHI round-bottomed flask were and said flask was placed in a ventilated oven at 110° C. overnight, i.e. for around 15-17 h.

The next day, the mixture was subjected to the following temperature and pressure profile:
180° C. (1 h) at Patm
200° C. (1 h) at 200 mbar
200° C. (30 min) at 80 mbar
200° C. (1 h) at 60 mbar
200° C. (2 h) at 3 mbar The product was crystallized in the BUCHI round-bottomed flask and was then subjected to a post-condensation step overnight at 190° C. and under 3 mbar.

EXAMPLE 2

Comparative Example Outside of the Invention

The purpose of this example is to reproduce the teaching of Takahashi explained above.

17.1 g of pure (99%) solid glycolic acid and 0.1 g of Zn acetate dihydrate were introduced into an 80 ml BUCHI round-bottomed flask; the whole assembly was placed in a ventilated oven in order to melt the catalyst (while being mixed) and left at 110° C. overnight.

The next day, the mixture, which was almost completely crystallized, was subjected to the following temperature and pressure profile:
190° C. (1 h) at Patm (melting)
190° C. (1 h) at 200 mbar
190° C. (4 h) at 40 mbar (start of crystallization)
190° C. (1 h) at 3 mbar
240° C. Patm for 20 min for complete melting
190° C. (22 h) at 3 mbar (rapid crystallization).

An ARES measurement gave a dynamic viscosity of 0.6 Pa·s at 100 rad/s and of 3.2 Pa·s at 1 rad/s, which indicates a very fluid polymer having insufficient melt strength.

EXAMPLE 3

Test According to the Invention, with Addition of Epoxysilane to GA 17.77 g of pure (99%) solid glycolic acid were introduced into an 80 ml BUCHI round-bottomed flask, then 7.7 g of water were added and the acid was left to dissolve in the water by heating at 50-80° C. in order to favour the dissolution.

Next, 0.46 g of glycidoxypropyltrimethoxysilane was added (i.e. around 2.6% by weight of GA or 8.3 mmol of epoxide functional groups and 25 mmol of alcoholate functional groups (that can be hydrolyzed to alcohol functional groups) per mol of GA). Everything was dissolved and the solution obtained was perfectly clear.

The mixture was placed in a ventilated oven at 110° C. overnight.

The next day, the mixture was subjected to the following temperature and pressure profile:
205° C. (1 h) at Patm
205° C. (1 h) at 200 mbar
205° C. (30 min) at 80 mbar
205° C. (1 h) at 60 mbar
205° C. (2 h) at 3 mbar The product was crystallized in the BUCHI round-bottomed flask. Next, it was subjected to a post-condensation step overnight at 205° C. and under 3 mbar.

Figure 1:
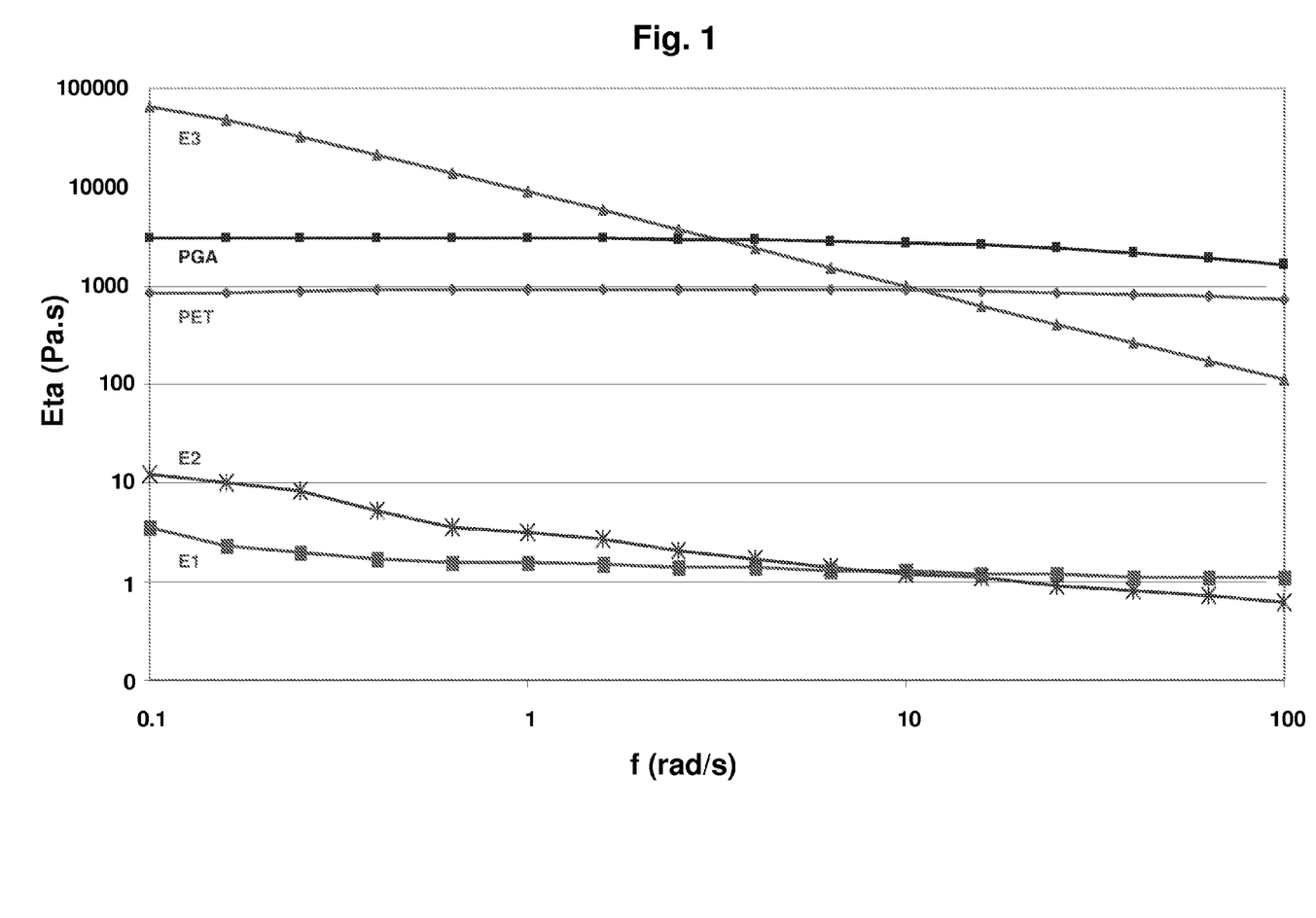
FIG. 1 shows the results of dynamic viscosity measurements carried out on the product from Example 3 (E3), and also on that of counterexample 1 (E1) and of counterexample 2 (E2), on a commercial grade of PGA (polyglycolide PURASORB PG20 from PURAC) and on a standard grade of PET (at 240° C. for all the products, except at 270° C. for PET).

Dynamic viscosity measurements were carried out on the product from Example 3 (E3), and also on that of counterexample 1 (E1) and of counterexample 2 (E2), on a commercial grade of PGA (polyglycolide PURASORB PG20 from PURAC) and on a standard grade of PET (at 240° C. for all the products, except at 270° C. for PET), the result of which is illustrated in the appended FIG. 1.

It can be seen therein that only the product according to Example 3 exhibits non-Newtonian behaviour.

EXAMPLE 4

Test According to the Invention, with Addition of Tetrol and of Tetracarboxylic Acid to GA 17 g of pure (99%) solid glycolic acid were introduced into an 80 ml BUCHI round-bottomed flask, then 7.5 g of water were added and the acid was left to dissolve in the water by heating at 50-80° C.

The following were then added sequentially: 0.087 g of pentaerythritol (i.e. 0.5% by weight of GA or 11.5 mmol of OH functional groups per mol of GA) and 0.15 g of butanetetracarboxylic acid (i.e. 0.9% by weight of GA or 11.5 mmol of COOH functional groups per mol of GA).

Everything was dissolved and the solution obtained was perfectly clear.

The mixture was placed in a ventilated oven at 110° C. overnight.

The next day, the mixture was subjected to the following temperature and pressure profile:
205° C. (1 h) at Patm
205° C. (1 h) at 200 mbar
205° C. (30 min) at 80 mbar
205° C. (1 h) at 60 mbar
205° C. (2 h) at 3 mbar The product was crystallized in the BUCHI round-bottomed flask. Next, it was subjected to a post-condensation step overnight at 205° C. and under 3 mbar.

EXAMPLE 5

Test According to the Invention, with Addition of BADGE to GA 17.1 g of pure (99%) solid glycolic acid were introduced into an 80 ml BUCHI round-bottomed flask, then 0.9 g of BADGE was added (i.e. 5.2% by weight of GA or 23.5 mmol of epoxide functional groups per mol of GA).

The whole assembly was placed in an oven in order to melt and mix, then the mixture was left in a ventilated oven at 110° C. overnight.

The next day, the mixture was subjected to the following temperature and pressure profile:
215° C. (1 h) at Patm
215° C. (1 h) at 200 mbar
215° C. (30 min) at 80 mbar
215° C. (1 h) at 60 mbar
215° C. (2 h) at 3 mbar The product was crystallized in the BUCHI round-bottomed flask. Next, it was subjected to a post-condensation step overnight at 180° C. and under 3 mbar.

EXAMPLE 6

Test According to the Invention, with Addition of Tetrol and of Tetracarboxylic Acid to LA 20 g of lactic acid in aqueous solution at a concentration of 80% (16 g of lactic acid per 4 g of water) were introduced into an 80 ml BUCHI round-bottomed flask, then the following were added sequentially: 0.136 g of pentaerythritol (i.e. 0.85% by weight of LA or 22.5 mmol of OH functional groups per mol of LA) and 0.232 g of butanetetracarboxylic acid (i.e. 1.45% by weight of LA or 22.5 mmol of COOH functional groups per mol of LA).

Everything was solubilized and the solution obtained was placed in an unventilated oven at 50° C. for one night (loss of 1.4 g), then one night at 75° C. (loss of 2.3 g) then one weekend at 70° C. (loss of 4.21 g).

The mixture thus treated was subjected to the following temperature and pressure profile:
205° C. (3 h) at Patm
205° C. (1 h) at 800 mbar
205° C. (1 h) at 600 mbar
205° C. (1 h) at 200 mbar
205° C. (30 min) at 80 mbar
205° C. (30 min) at 60 mbar
205° C. (30 min) at 20 mbar
205° C. (1 h) at 8 mbar The product was crystallized in the BUCHI round-bottomed flask. Next, it was subjected to a post-condensation step overnight at 160° C. and under 8 mbar.

Figure 2:
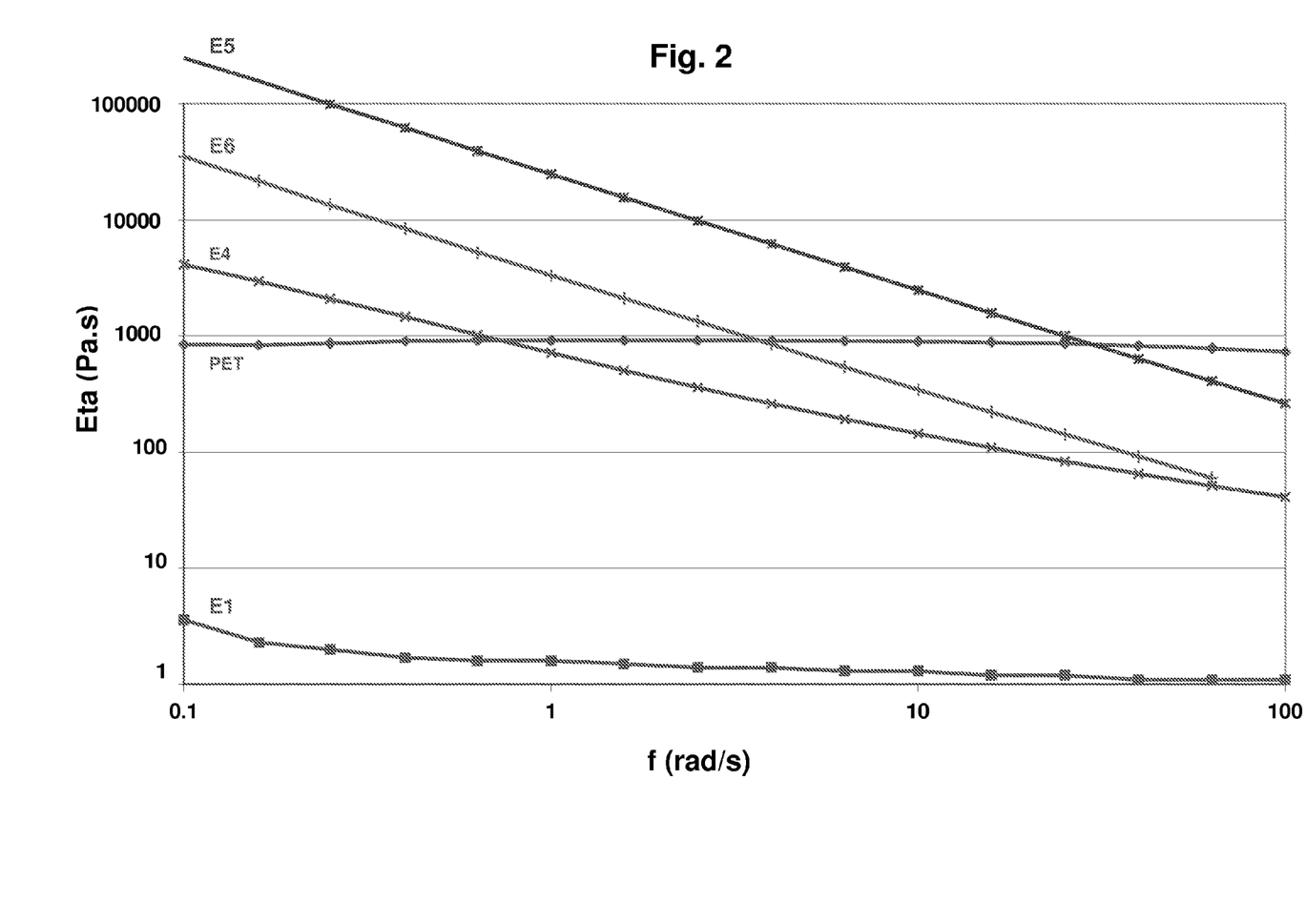
FIG. 2 shows the results of dynamic viscosity measurements carried out on the products from Examples 4 to 6 (curves E4, E5 and E6), and also on a standard grade of PET and on the counterexample 1 (E1) (at 240° C. for all the products, except at 270° C. for PET).

Dynamic viscosity measurements were carried out on the products from Examples 4 to 6 (curves E4, E5 and E6), and also on a standard grade of PET and on the counterexample 1 (E1) (at 240° C. for all the products, except at 270° C. for PET), the result of which is illustrated in the appended FIG. 2.

It can be seen therein that only the products according to Examples 4 to 6 exhibit non-Newtonian behaviour.

EXAMPLE 7

Test According to the Invention, with Addition of Triol and Triacid to GA 765 g of pure (99%) solid glycolic acid were introduced into a 1.5 l reactor, to which were added 2.31 g of trimethylolpropane (i.e. 0.3% by weight of GA or 5.1 mmol of OH functional groups per mol of GA) and 3.03 g of tricarballylic acid (i.e. 0.4% by weight of GA or 5.1 mmol of COOH functional groups per mol of GA). Next, 270 g of water were added. The mixture was heated at 50-80° C., with stirring, until a perfectly clear solution was obtained.

Then 2.31 g of methanesulphonic acid (i.e. 0.3%) were added as a polycondensation catalyst. The medium was stirred in order to homogenize it, then the mixture was heated at 110-115° C. in the reactor, with stirring and a stream of nitrogen, for 64 h.

Next, the mixture was subjected to the following temperature and pressure profile:
215° C. (1 h) at Patm
215° C. (1 h) at 200 mbar
215° C. (30 min) at 80 mbar
215° C. (1 h) at 60 mbar
215° C. (1 h) at 30 mbar
215° C. (10 min) at 8 mbar
215° C. (2 h) at 2.5 mbar
215° C. (1 night) at 2.5 mbar The reactor was then cooled to ambient temperature. The product, crystallized in the reactor, was milled in the form of grains having a diameter of around 0.5 mm in a Pulverisette® mill from FRITSCH.

Figure 3:
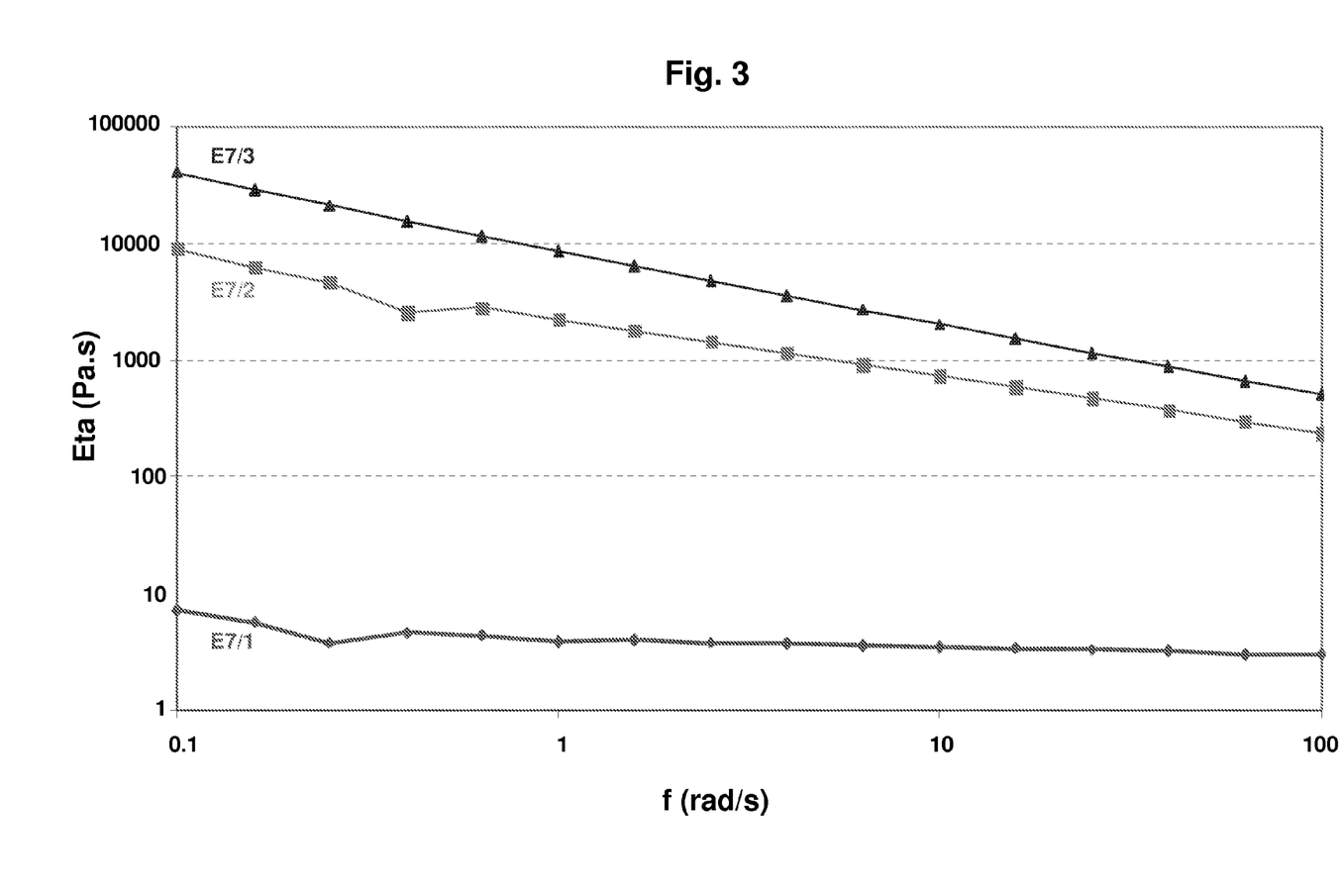
FIG. 3 shows the results of dynamic viscosity measurements carried out (at 245° C.) on the product according to Example 7 before the solid post-condensation step (E7/1) and after 68 h (E7/2) and 138 h (E7/3) respectively of solid post-condensation.

The powder obtained was reintroduced into the reactor and the product was subjected to a solid post-condensation step at 170° C. under 0.1 mbar for 138 h. Dynamic viscosity measurements were carried out (at 245° C.) on the product before the solid post-condensation step (E7/1) and after 68 h (E7/2) and 138 h (E7/3) respectively of solid post-condensation. The result of these measurements is illustrated in the appended FIG. 3.

EXAMPLE 8

Test According to the Invention, with Addition of Triol and Triacid to GA 20 g of pure (99%) solid glycolic acid were introduced into a 80 ml BUCHI round-bottomed flask, to which were added 0.06 g of trimethylolpropane (i.e. 0.3% by weight of GA or 5.1 mmol of OH functional groups per mol of GA) and 0.08 g of tricarballylic acid (i.e. 0.4% by weight of GA or 5.1 mmol of COOH functional groups per mol of GA). Next, 7.07 g of water were added. The mixture was heated at 50-80° C., with stirring, until a perfectly clear solution was obtained.

Then 0.06 g of methanesulphonic acid (i.e. 0.3%) were added as a polycondensation catalyst. The mixture was stirred in order to homogenize it.

The mixture was then placed in a ventilated oven at 110° C. overnight.

The next day, the mixture was subjected to the following temperature and pressure profile:
215° C. (1 h) at Patm
215° C. (1 h) at 200 mbar
215° C. (30 min) at 80 mbar
215° C. (1 h) at 60 mbar
215° C. (1 h) at 30 mbar
215° C. (10 min) at 8 mbar
230° C. (2 h) at 3 mbar
170° C. (1 h 30 min) at 3mbar The product was crystallized in the BUCHI round-bottomed flask. The product was then left overnight at 22° C. at 2.5 mbar.

Next, the product was milled, then reintroduced into the BUCHI round-bottomed flask in order to be subjected to a solid post-condensation step at 170° C. under 0.1 mbar for 72 h.

Figure 4:
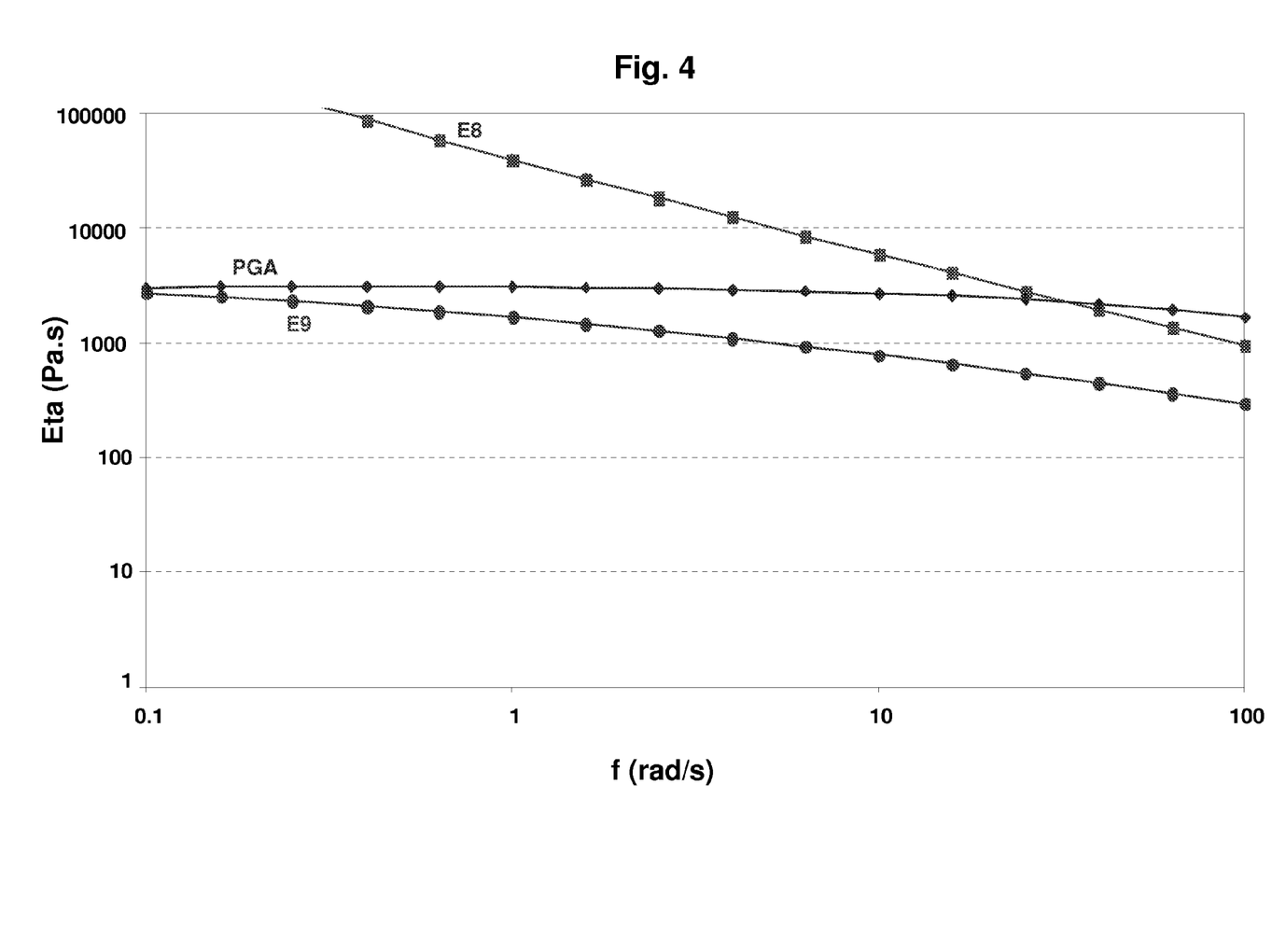
FIG. 4 shows the results of dynamic viscosity measurements carried out on the product from Example 8 (curve E8), Example 9 (curve E9), and also on a commercial grade of PGA (polyglycolide PURASORB PG20 from PURAC) (at 245° C. for the product E8 and E9, and at 240° C. for the PGA from PURAC).

Dynamic viscosity measurements were carried out on the product from Example 8 (curve E8), and also on a commercial grade of PGA (polyglycolide PURASORB PG20 from PURAC) (at 245° C. for the product E8 and at 240° C. for the PGA from PURAC), the result of which is illustrated in the appended FIG. 4.

It can be seen therein that only the product according to Example 8 exhibits non-Newtonian behaviour.

EXAMPLE 9

Test According to the Invention, with Addition of Triol and Triacid to GA

This test was carried out under the same conditions as Example 8 except for the amounts of triol and of triacid added, which were halved: 0.03 g of trimethylolpropane (i.e. 0.15% by weight of GA or 2.6 mmol of OH functional groups per mol of GA) and 0.04 g of tricarballylic acid (i.e. 0.2% by weight of GA or 2.6 mmol of COOH functional groups per mol of GA).

After 2 h at 230° C. and 3 mbar, the product was left overnight at 180° C. and 3 mbar (and not 1 h 30 min at 170° C. and 3 mbar, then 1 night at 22° C. and 2.5 mbar as in Example 8).

The product was crystallized in the BUCHI round-bottomed flask. The product was milled, then reintroduced into the BUCHI round-bottomed flask in order to be subjected to a solid post-condensation step at 180° C. under 0.1 mbar for 53 h.

Dynamic viscosity measurements were carried out on the product from Example 9 (curve E9) at 245° C., the result of which is illustrated in the appended FIG. 4.

It can be seen therein that the product according to Example 9 exhibits non-Newtonian behaviour.

EXAMPLE 10

Test According to the Invention, with Addition of Epoxysilane to GA 255 g of pure (99%) solid glycolic acid were introduced into a 1.5 l reactor were. Next, 90 g of water was added and the acid was left to dissolve in the water by heating at 50-80° C., with stirring, in order to favour the dissolution. The solution obtained was perfectly clear.

Next, 3.83 g of glycidoxypropyltrimethoxysilane were added (i.e. 1.5% by weight of GA or 4.8 mmol of epoxide functional groups and 14.5 mmol of alcoholate functional groups per 1 mol of GA), then 0.77 g of methanesulphonic acid (i.e. 0.3%) was added as a polycondensation catalyst, and the medium was stirred in order to homogenize it.

The mixture was heated at 110-115° C. in the reactor, with stirring and a stream of nitrogen, for 65 h.

Next, the mixture was subjected to the following temperature and pressure profile:
215° C. (1 h) at Patm
215° C. (1 h) at 200 mbar
215° C. (30 min) at 80 mbar
215° C. (1 h) at 60 mbar
215° C. (1 h) at 30 mbar
215° C. (10 min) at 8 mbar
215° C. (2 h) at 2.5 mbar
170° C. (1 night) at 2.5 mbar The next day, the reactor was cooled to ambient temperature. The product, crystallized in the reactor, was milled in the form of grains having a diameter of around 0.5 mm in a Pulverisette® mill from FRITSCH.

The powder obtained was reintroduced into the reactor and the product was subjected to a solid post-condensation step at 170° C. under 0.1 mbar for 66 h.

Figure 5:
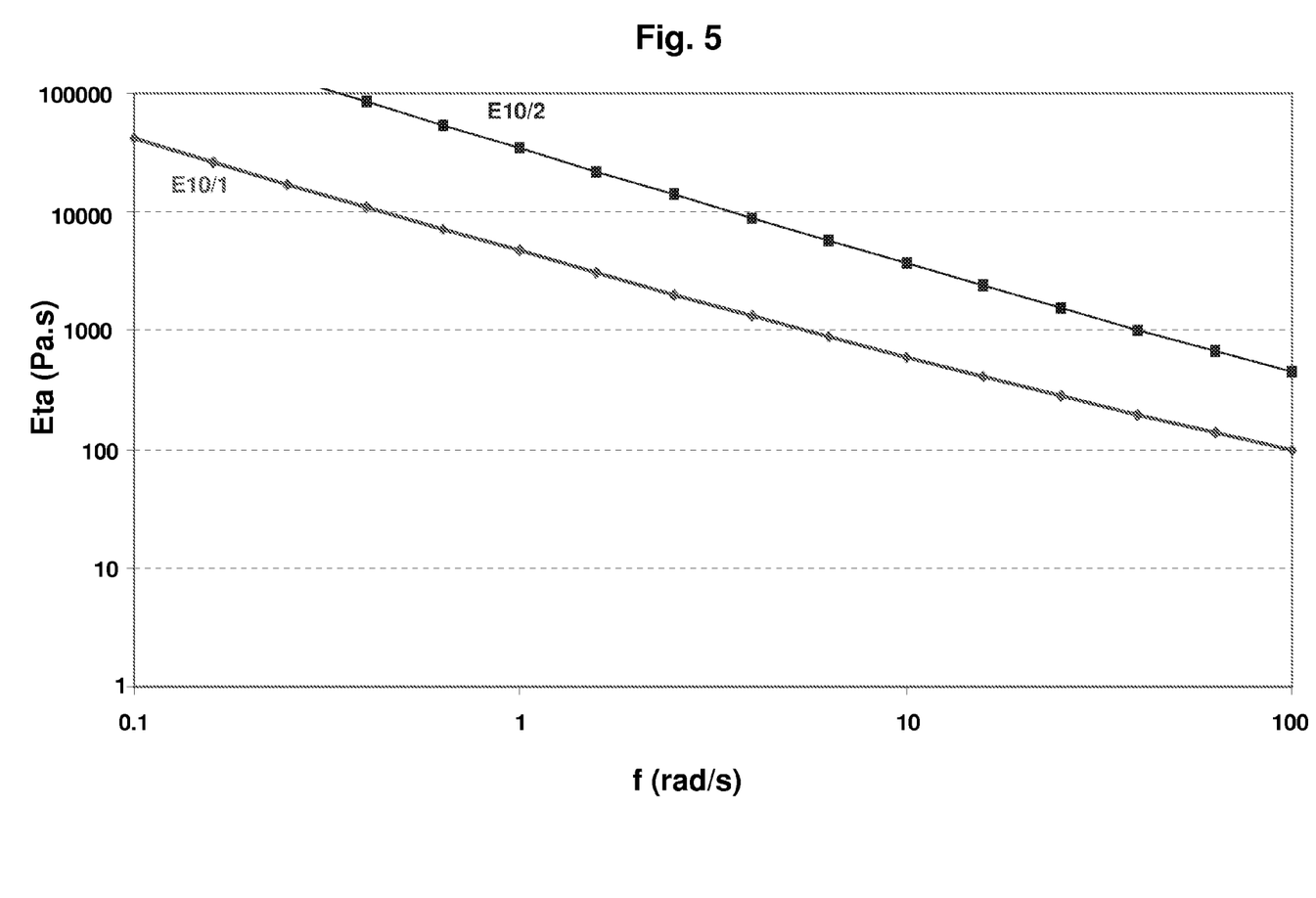
FIG. 5 shows the results of dynamic viscosity measurements carried out (at 240° C.) on the product of Example 10 before (E10/1) and after (E10/2) the solid post-condensation step (66 h).

Dynamic viscosity measurements were carried out (at 240° C.) on the product before (E10/1) and after (E10/2) the solid post-condensation step (66 h). The result of these measurements is illustrated in the appended FIG. 5.

EXAMPLE 11

Tests According to the Invention, with Addition of Triol and Triacid to a GA/LA (95/5) Mixture 19.09 g of pure (99%) solid glycolic acid and 1.25 g of lactic acid as an 80% solution in water, which corresponds to a 95/5 GA/LA mixture, were introduced into an 80 ml BUCHI round-bottomed flask. The following were added: 0.06 g of trimethylolpropane (i.e. 0.3% by weight of the GA/LA mixture or 5.1 mmol of OH functional groups per mol of the GA/LA mixture) and 0.08 g of tricarballylic acid (i.e. 0.4% by weight of the GA/LA mixture or 5.1 mmol of COOH functional groups per mol of the GA/LA mixture), then 7 g of water. The mixture was heated at 50-80° C., with stirring, until a perfectly clear solution was obtained.

Then 0.06 g of methanesulphonic acid (i.e. 0.3%) were added as a polycondensation catalyst. The mixture was stirred in order to homogenize it.

The mixture was placed in a ventilated oven at 110° C. for around 40 h.

Next, the mixture was subjected to the following temperature and pressure profile:
210° C. (1 h) at Patm
210° C. (1 h) at 200 mbar
210° C. (30 min) at 80 mbar
210° C. (1 h) at 60 mbar
210° C. (1 h) at 30 mbar
210° C. (10 min) at 8 mbar
210° C. (2 h) at 5 mbar
170° C. (1 h 30 min) at 5 mbar
160° C. (1 night) at 3 mbar The product was crystallized in the BUCHI round-bottomed flask.

The next day, the reactor was cooled to ambient temperature. The product was milled, then reintroduced into the BUCHI round-bottomed flask in order to be subjected to a solid post-condensation step at 160° C. under 0.1 mbar for 114 h.

Figure 6:
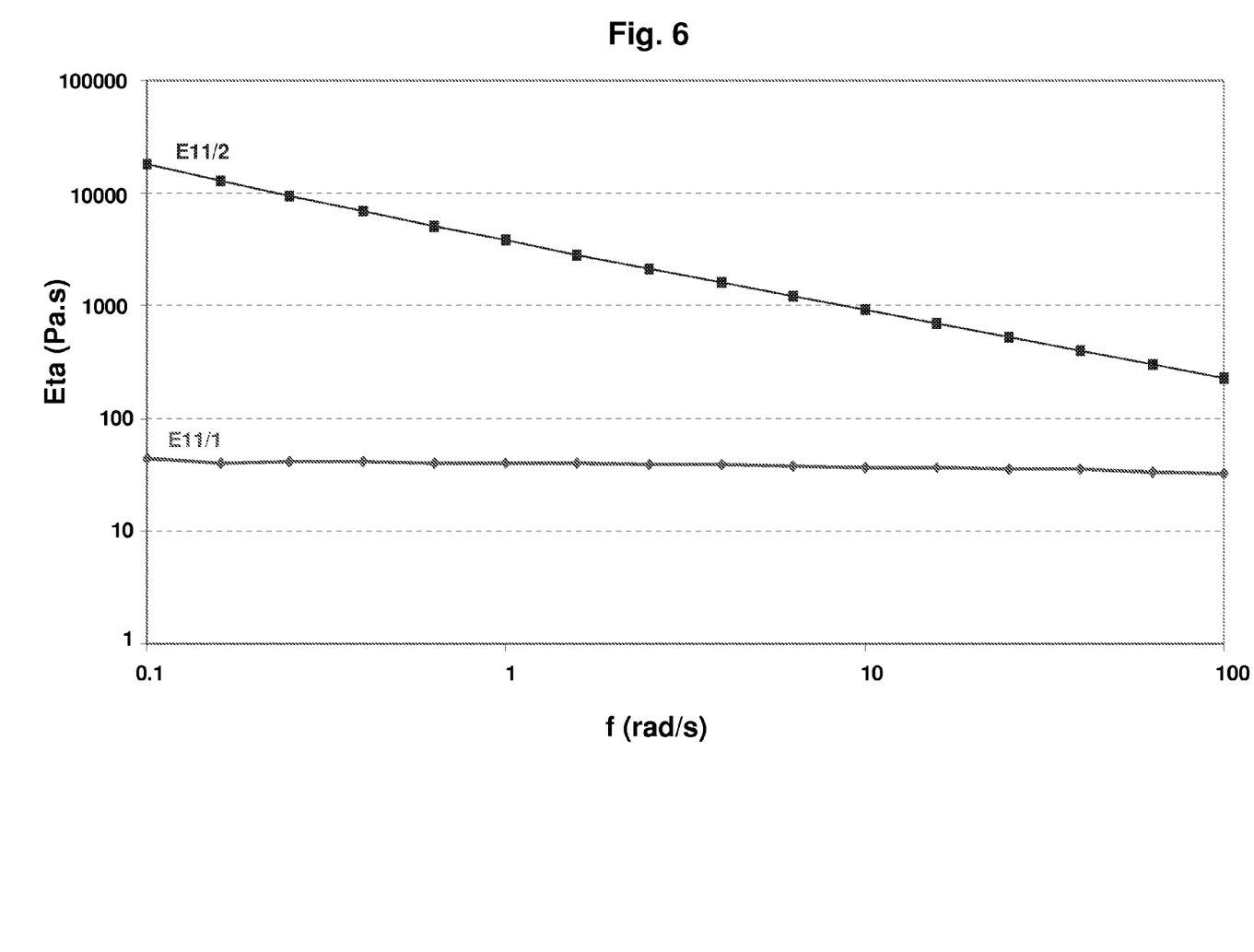
FIG. 6 shows the results of dynamic viscosity measurements carried out (at 220° C.) on the product of Example 11 after 44 h (E11/1) and 114 h (E11/2) respectively of the solid post-condensation step.

Dynamic viscosity measurements were carried out (at 220° C.) on the product after 44 h (E11/1) and 114 h (E11/2) respectively of the solid post-condensation step. The result of these measurements is illustrated in the appended FIG. 6.

EXAMPLE 12

Tensile Strength

Prior to the manufacture of the test specimens, the extruder (DSM) was preheated to 245° C., the (dumbbell type) tensile test specimen mould was heated to 80° C., and the injection ram was heated to 220° C.

0.15% of ULTRANOX 626® stabilizer from CHEMTURA was added to 20 g of polyglycolide prepared according to Example 7 (after 138 h of solid post-condensation step), previously dried under vacuum at 80° C. for 2 h. The mixture was kneaded at a rotation speed of 20 rpm for around 4 minutes in the extruder. The mixture was then injection moulded in order to form the tensile test specimens. The injection moulding pressure was 5 bar and the hold pressure was 7 bar for 10 seconds. The test specimens were dried for 2 h under vacuum at 80° C. and stored away from moisture. The test specimens had a width of the order of 5 mm and a thickness of the order of 2 mm.

This procedure was repeated with a commercial grade of linear PGA (polyglycolide PURASORB PG20 from PURAC).

The tensile strength of these test specimens was measured using a ZWICK universal testing machine (model Z020) equipped with a Multisens extensometer. The gap between the jaws of the machine was 58 mm. The gap between the arms of the Multisens extensometer (displacement sensor making it possible to measure the strain during the test) was 25 mm. The measurements were carried out at a temperature of 22° C.

The results are given in the following table.

|  | Mod (MPa) | σRupt (MPa) | εRupt (extenso) (%) |
|---|---|---|---|
| PGA Ex. 7 | 9640 | 116 | 15 |
| PGA PURAC | 7200 | 68 | 0.9 |

The term "Mod" denotes the segment modulus between 0.05 and 0.25% strain, that is to say the slope of the curve between 0.05 and 0.25% strain. The higher this value, the more rigid the material.
The term "σRupt" denotes the stress (force/cross-sectional area of the test specimen) just before the test specimen breaks. The higher this value, the more resistant the material is to rupture.
The term "εRupt (extenso)" denotes the strain in % measured by the gap between the arms of the Multisens (displacement of the Multisens (mm)/25 mm × 100) when the test specimen breaks. The higher this value, the more deformable the material before rupture.

Should the disclosure of any of the patents and patent applications that are incorporated herein by reference conflict with the present disclosure to the extent that it might render a term unclear, the present disclosure shall take precedence.

The invention claimed is:

1. A process for manufacturing a polymer by polycondensation of a hydroxy acid, said polymer comprising at least 80% by weight of units that correspond to the hydroxy acid, said process comprising the following steps:
   mixing with the hydroxy acid at least one polyfunctional reactant capable of giving rise to the formation of a three-dimensional polymer network; and
   subjecting the mixture to temperature and pressure conditions and for a duration which are all suitable for giving rise to the formation of the network;
   wherein the polyfunctional reactant is an epoxysilane and the hydroxy acid is selected from the group consisting of glycolic acid, lactic acid, and mixtures thereof.

2. The process according to claim 1, wherein the polyfunctional reactant is glycidyloxypropyltrimethoxysilane.

3. The process according to claim 1, wherein the polymer is a semicrystalline polymer, and wherein the polycondensation comprises phase A and phase B, wherein the polycondensation is initiated during several hours at a temperature below the melting/crystallization temperature of the polymer in phase A, and is then continued at a temperature close to the melting/crystallization temperature of the polymer until crystallization of said polymer in order to obtain a solid in phase B.

4. The process according to claim 3, wherein said phase A takes place at atmospheric pressure, and wherein said phase B is initiated at atmospheric pressure then continues under a progressive vacuum until a pressure of less than 10 mbar is attained.

5. The process according to claim 4, further comprising a solid post-condensation step, wherein the solid is kept under vacuum and is left to rest for several hours at a temperature above its glass transition temperature but below its melting/crystallization temperature.

6. The process according to claim 3, wherein the solid obtained is subjected to a post-condensation in a microwave device for a duration and under conditions such that they cause the melting thereof.

7. The process according to claim 1, wherein said polymer is a poly(hydroxy acid) comprising poly(hydroxy acid) chains bridged into a three-dimensional network by polyfunctional molecules.

8. The process according to claim 7, wherein said poly(hydroxy acid) comprises at least 80% by weight of units that correspond to glycolic or lactic acid in the form of linear oligomer chains, wherein said oligomer chains are joined to one another in a three-dimensional network by one or more multifunctional organic compounds.

9. The process according to claim 7, wherein said poly(hydroxy acid) is insoluble in hexafluoroisopropanol.

10. The process according to claim 7, wherein said poly(hydroxy acid) has a non-Newtonian viscoelastic behavior in the melt state, and has a melt viscosity at 240° C. of the order of tens or hundreds of Pa·s at 100 rad/s and of the order of tens of thousands or hundreds of thousands of Pa·s at 1 rad/s.

* * * * *